(12) United States Patent
Nishio et al.

(10) Patent No.: US 10,866,725 B2
(45) Date of Patent: Dec. 15, 2020

(54) INPUT DEVICE FOR TOUCH OPERATION

(71) Applicant: PANASONIC INTELLECTUAL PROPERTY MANAGEMENT CO., LTD., Osaka (JP)

(72) Inventors: Tsuyoshi Nishio, Chiba (JP); Naoki Usui, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/687,062

(22) Filed: Nov. 18, 2019

(65) Prior Publication Data
US 2020/0167053 A1 May 28, 2020

(30) Foreign Application Priority Data
Nov. 22, 2018 (JP) .................... 2018-219236

(51) Int. Cl.
| | | |
|---|---|---|
| *G09G 3/30* | (2006.01) | |
| *G09G 5/00* | (2006.01) | |
| *G06F 3/0488* | (2013.01) | |
| *G02F 1/13357* | (2006.01) | |
| *G06F 3/041* | (2006.01) | |

(52) U.S. Cl.
CPC ...... *G06F 3/0488* (2013.01); *G02F 1/133603* (2013.01); *G06F 3/0412* (2013.01); *G06F 2203/04114* (2019.05)

(58) Field of Classification Search
CPC .. G09G 3/36; G09G 5/00; G09G 3/30; G09G 3/10; G09G 5/08; G06F 3/041; G06F 3/045; G06F 3/038; G06F 3/033
See application file for complete search history.

(56) References Cited

U.S. PATENT DOCUMENTS

| | | | |
|---|---|---|---|
| 2009/0002138 A1* | 1/2009 | Tseng ................ | A61B 5/021 340/332 |
| 2012/0069444 A1* | 3/2012 | Campbell ........... | B60Q 3/258 359/630 |
| 2016/0264054 A1* | 9/2016 | Uken ................. | G06F 3/04883 |
| 2017/0253179 A1* | 9/2017 | Kumada ............. | B60Q 3/14 |
| 2018/0173398 A1 | 6/2018 | Doi et al. | |
| 2018/0340624 A1* | 11/2018 | Wang ................. | F16K 11/00 |

FOREIGN PATENT DOCUMENTS

WO  2017/018384  2/2017

\* cited by examiner

*Primary Examiner* — Pegeman Karimi
(74) *Attorney, Agent, or Firm* — Greenblum & Bernstein, P.L.C.

(57) ABSTRACT

An input device includes a manipulation surface, a light emitting circuit disposed along the manipulation surface, and a detection circuit configured to detect an action of a finger on the manipulation surface. The light emitting circuit has first and second segment groups. The second segment group is disposed along the first segment group. The first segment group emits light at a first intensity if the detection circuit is restricted to receive a prescribed input. The first segment group emits light at a second intensity if the detection circuit is allowed to receive the prescribed input. A part of the second segment group emits light if the detection circuit detects an action of the finger alongside the first segment group while the first segment group is emitting light at the second intensity.

23 Claims, 11 Drawing Sheets

INPUT DEVICE FOR TOUCH OPERATION

BACKGROUND OF THE INVENTION

1. Field of the Invention

The present disclosure relates to an input device that is used for, for example, sound volume adjustment, setting temperature adjustment for an air-conditioner, and brightness adjustment for a room light in a vehicle such as an automobile and, more particularly, to such an input device employing a touch panel.

This disclosure relates to a vehicle that was exhibited by Panasonic Corporation in CES2018 that was held at Las Vegas, Nev., U.S. from Jan. 9 to 12, 2018.

2. Description of the Related Art

Among related input devices having a touch panel is a touch panel type information terminal device disclosed in WO 2017/018384, for example. In this touch panel type information terminal device, a touchable pointer consisting of a pointer portion and a manipulation portion that are displayed so as to be separated and spaced from each other. If a user performs a movement manipulation on the manipulation portion with a finger in this state, the pointer portion is moved and a desired point target is indicated by a pointer tip portion.

However, the touch panel type information terminal device disclosed in WO 2017/018384 requires a complex display control and is costly because the pointer portion and the manipulation portion are displayed individually.

Furthermore, the pointer portion is to indicate a desired point target (mainly a use). It is difficult for the pointer portion to make a smooth, intuitive input though it is not suitable for input for adjustment of, for example, a sound volume, an air-conditioner setting temperature, and a room light brightness level.

SUMMARY OF THE INVENTION

An object of the present disclosure is to provide an input device that can perform a display control easily and that enables easy and intuitive input.

The disclosure provides an input device including: a manipulation surface that can be touched by at least a finger; a light emitting circuit which is disposed along the manipulation surface and can emit prescribed light; and a detection circuit capable of detecting an action of at least the finger on the manipulation surface, wherein the light emitting circuit has at least a first segment group and a second segment group; the first segment group is disposed along a prescribed shape in a plan view; the second segment group is disposed along the first segment group in a plan view; the first segment group emits light at a first intensity if the detection circuit cannot receive a prescribed input; the first segment group emits light at a second intensity that is higher than the first intensity if the detection circuit can receive at least the prescribed input; and at least part of the second segment group emits light if the detection circuit has detected an action of the finger alongside the first segment group while the first segment group is emitting light at the second intensity.

DETAILED DESCRIPTION OF THE EXEMPLARY EMBODIMENTS

An input device according a specific embodiment of the present disclosure will be hereinafter described in detail with reference to the drawings when necessary. However, unnecessarily detailed descriptions may be omitted. For example, a detailed description of a well-known item and a duplicate description of an item having substantially the same as what was already described may be omitted. This is to prevent the following description from becoming unnecessarily redundant and thereby allow those skilled in the art to understand it easily. The accompanying drawings and the following description are provided to allow those skilled in the art to understand the disclosure sufficiently and are not intended to restrict the subject matter described in the claims.

The exemplary embodiment of the disclosure will be hereinafter described in detail with reference to the drawings.

Figure 1:
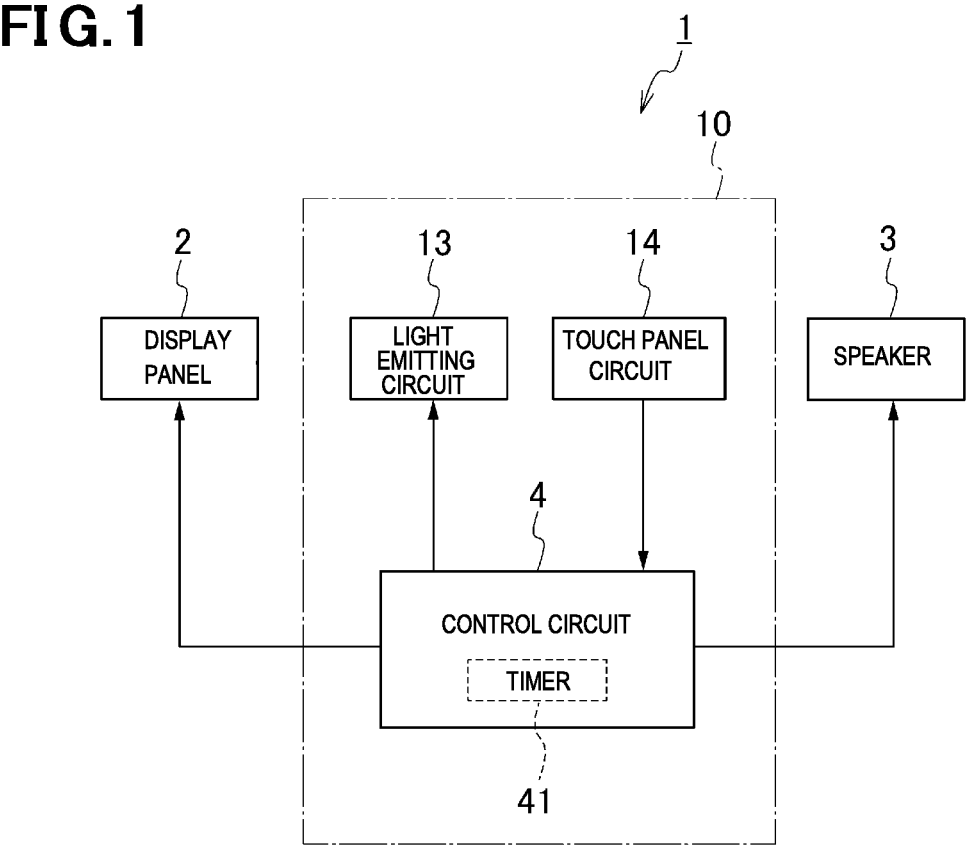
FIG. 1 is a block diagram showing a rough configuration of a vehicular apparatus including an input device according to an embodiment.

The input device 10 according to the embodiment will be hereinafter described with reference to FIG. 1. FIG. 1 is a block diagram showing a rough configuration of a vehicular apparatus 1 including the input device 10 according to the embodiment. As shown in FIG. 1, the vehicular apparatus 1, which is installed in a vehicle 20 (see FIG. 3), is equipped with a display panel 2, a speaker 3, and the input device 10. A prescribed content is displayed on the display panel 2. The speaker 3 outputs a sound that is associated with the prescribed content displayed on the display panel 2. The input device 10 which is included in the vehicular apparatus 1 receives, for example, an input for setting a sound volume of the prescribed content displayed on the display panel 2, an input for setting an air-conditioner temperature, or an input for setting a room light brightness level.

Figure 2:
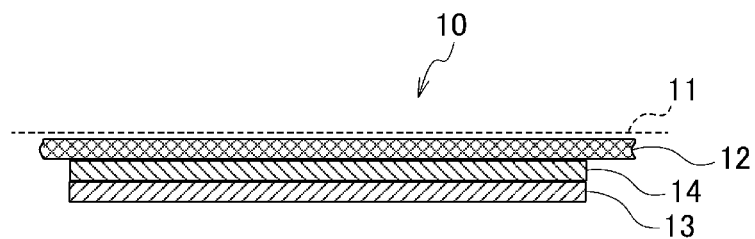
FIG. 2 is a sectional view showing the structure of the input device according to the embodiment.

FIG. 2 is a sectional view showing the structure of the input device 10 according to the embodiment. As shown in FIG. 2, the input device 10 is equipped with a manipulation surface 11 that can be touched by at least a finger, a sheet 12 which is disposed on the side of the bottom surface of the manipulation surface 11 and parallel with the manipulation surface 11, a light emitting circuit (display circuit) 13 which is disposed on the side of the bottom surface of the sheet 12 and parallel with the manipulation surface 11 and can emit visible light (prescribed light), and a touch panel circuit (detection circuit) 14 which is disposed between the manipulation surface 11 and the light emitting circuit 13 and parallel with the manipulation surface 11 and the light emitting circuit 13 and can detect an action of at least a finger on the manipulation surface 11.

The sheet 12 may be either stuck to the touch panel circuit 14 with double-sided adhesive tape or adhesive or formed by printing it on the touch panel circuit 14 directly. The light emitting circuit 13 is an organic EL (electroluminescence) display circuit or a liquid crystal display circuit having a backlight. Being transparent, the sheet 12 and the touch panel circuit 14 transmits light emitted from the light emitting circuit 13. An ultrasonic surface acoustic wave type, resistive film type, or capacitance type touch panel is used as the touch panel circuit 14.

Although not shown in FIG. 2, the input device 10 according to the embodiment is also equipped with a control circuit 4. The control circuit 4 performs display control on the display panel 2 of the vehicular apparatus 1, outputs an audio signal to the speaker 3, performs light emission control on the light emitting circuit 13 of the input device 10, and receives an information signal indicating a contact position on the touch panel circuit 14. The control circuit 4 is equipped with a CPU (central processing unit), a ROM (read-only memory), a RAM (random access memory), interfaces, a storage device, etc. none of which are shown in FIG. 2. The ROM is stored with programs for controlling the CPU. The RAM is a work memory that is used during operation of the CPU. The interfaces connect the display panel 2, the light emitting circuit 13, and the touch panel circuit 14 to the CPU. The control circuit 4 is equipped with a timer 41 which serves for setting of an input receivable time, that is, a time during which an input manipulation can be received. For example, if the timer 41 is set at 10 sec, an input that takes more than 10 sec is not received. For example, the input device 10 be disposed on, for example, an armrest 27 (see FIGS. 3 and 4) or its vicinity.

Figure 3:
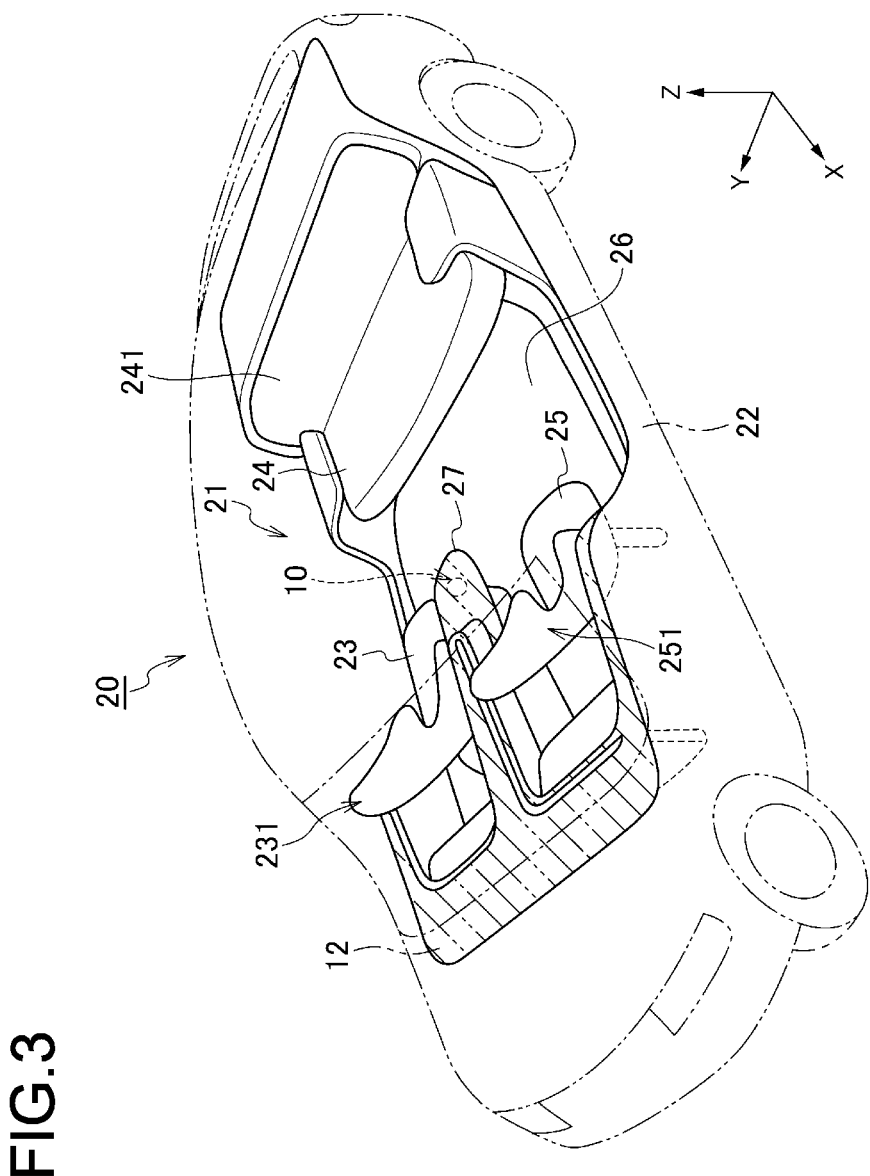
FIG. 3 is a see-through perspective view of a vehicle in which the vehicular apparatus including the input device according to the embodiment is installed.
Figure 4:
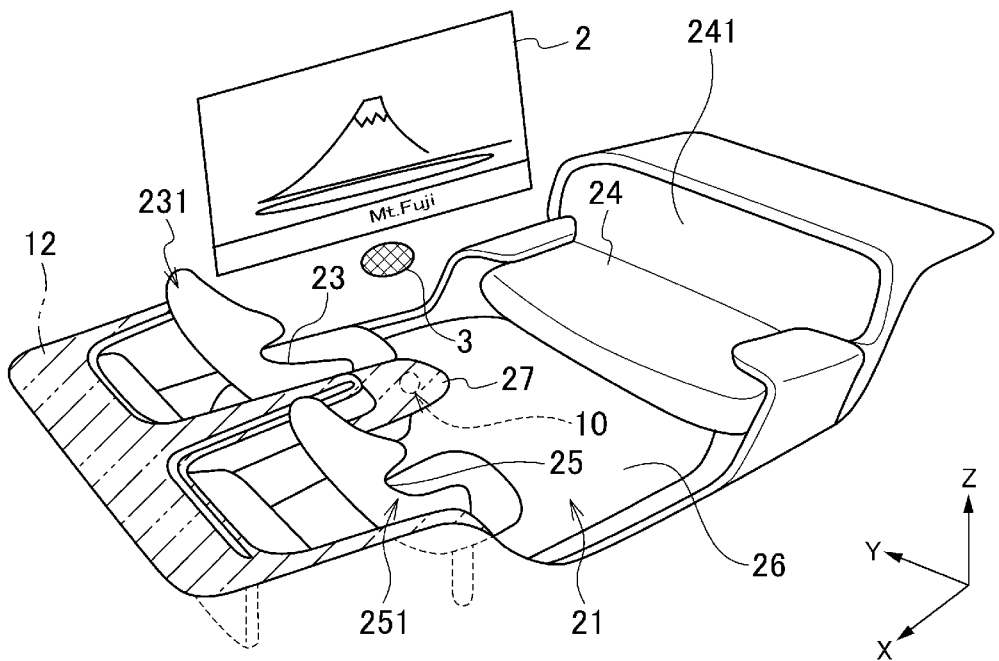
FIG. 4 is a perspective view showing a compartment of the vehicle in which the vehicular apparatus including the input device according to the embodiment is installed.

The vehicle 20 in which the vehicular apparatus 1 is installed will now be described. FIG. 3 is a see-through perspective view of the vehicle 20. FIG. 4 is a perspective view showing a compartment 21 of the vehicle 20. As shown in FIG. 3, for example, the vehicle 20 is an automobile that complies with the Road Transport Vehicle Act and is capable of autonomous running. The vehicle 20 is equipped with a vehicle body 22 having the compartment 21, a first seat 23, a second seat 24, and a third seat 25 which are arranged in the compartment 21, and a floor surface 26 which constitutes part of the compartment 21. The display panel 2 of the vehicular apparatus 1 is installed at one side of the compartment 21 and separates the inside of the compartment 21 from the outside of the vehicle 20. The speaker 3 of the vehicular apparatus 1 is disposed at the one side of the compartment 21 under the display panel 2. The input device 10 of the vehicular apparatus 1 is disposed on the armrest 27 which is located between the first seat 23 and the third seat 25.

The first seat 23 and the second seat 24 are arranged alongside the one side of the compartment 21, that is, in the X-axis direction, the X axis being defined as the advancing direction of the vehicle 20. The first seat 23 and the third seat 25 are arranged in the Y direction which is perpendicular to the X-axis direction and the third seat 25 is located on the left of the first seat 23. The first seat 23, the second seat 24, and the third seat 25 have backrests 231, 241, and 251, respectively. Each of the first seat 23 and the third seat 25 is a seat for one person and the second seat 24 is a seat for plural persons (what is called a bench seat). Having a rotary shaft, the first seat 23 can be oriented in both of the forward direction of the vehicle 20 and its backward direction, that is, the direction toward the second seat 24, by rotated about the rotary shaft. When the first seat 23 is oriented so as to be opposed to the second seat 24, the backrest 231 of the first seat 23 and the backrest 241 of the second seat 24 face each other.

When the backrest 231 of the first seat 23 and the backrest 241 of the second seat 24 face each other, a passenger sitting in the first seat 23 and a passenger sitting in the third seat 25 can face each other and talk with each other. The backrest 231 of the first seat 23 and the backrest 241 of the second seat 24 need not always be opposed to each other completely so that a passenger sitting in the first seat 23 and a passenger sitting in the third seat 25 face each other squarely; it suffices that the backrests 231 and 241 be opposed to each other to such extent that a passenger sitting in the first seat 23 and a passenger sitting in the third seat 25 can talk with each other or make arrangements. The third seat 25 may also have a rotary shaft and be rotatable automatically or manually.

Although in the vehicle 20 the display panel 2 of the vehicular apparatus 1 is installed at the right side of the vehicle 20 between the first seat 23 and the second seat 24, it is naturally possible to install the display panel 2 at the left side of the vehicle 20 between the third seat 25 and the second seat 24. And, naturally, it is possible to install the display panel 2 at each of the right side and the left side of the vehicle 20. Likewise, the installation position of the speaker 3 of the vehicular apparatus 1 is not limited to the right side of the vehicle 20 between the first seat 23 and the second seat 24; the speaker 3 may be installed either at the left side of the vehicle 20 between the third seat 25 and the second seat 24 or at each of the right side and the left side of the vehicle 20.

Figure 5:
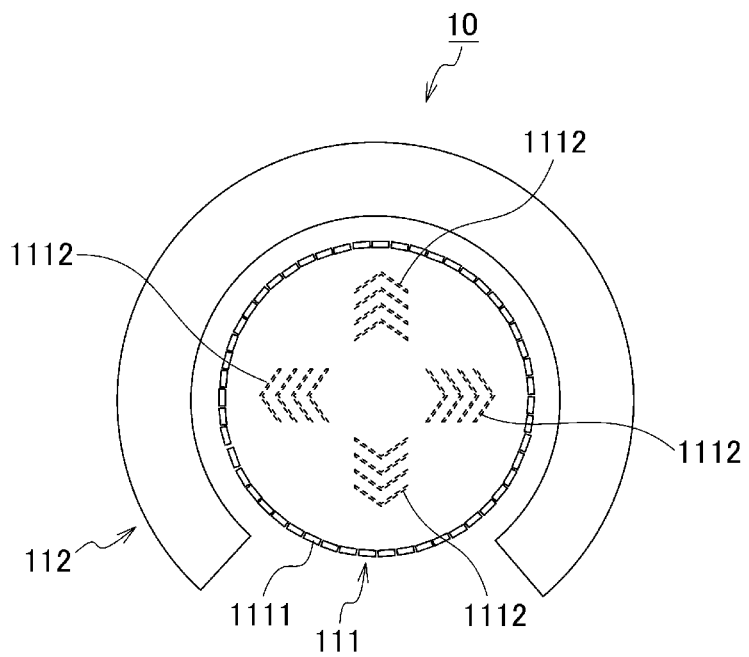
FIG. 5 is a plan view showing a state that a light emitting circuit of the input device according to the embodiment is not emitting light.
Figure 6:
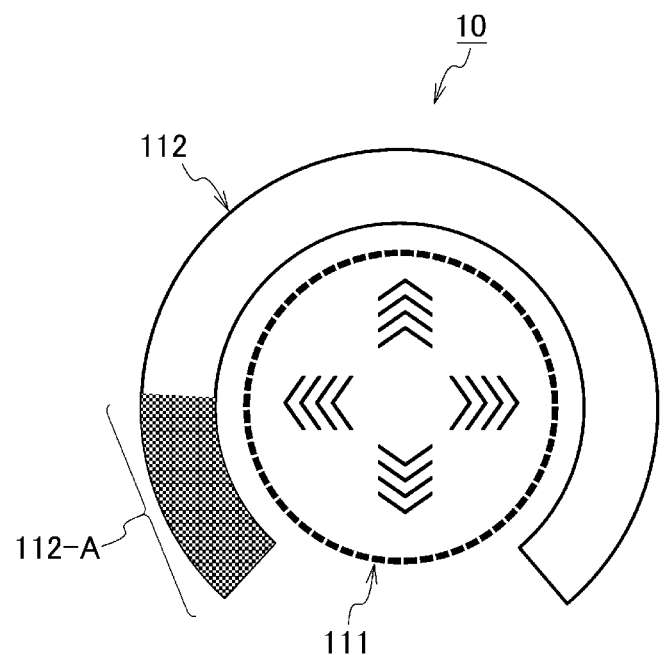
FIG. 6 is a plan view showing a state that the light emitting circuit of the input device according to the embodiment is emitting light.

Next, a light emission control of the control circuit 4 of the input device 10 according to the embodiment will be described. FIG. 5 is a plan view showing a state that the light emitting circuit 13 is not emitting light. FIG. 6 is a plan view showing a state that the light emitting circuit 13 is emitting light. As shown in FIGS. 5 and 6, the light emitting circuit 13 has a first segment group 111 and a second segment group 112. The first segment group 111 has plural rectangular segments 1111 which are arranged along a circle in a plan view. Sets of segments 1112 that are shaped like arrows indicating prescribed directions, respectively, exist inside the first segment group 111 so as to be arranged at intervals of 90°. Each segment of the first segment group 111 and each segment 1112 located inside the first segment group 111 have at least one LED (light-emitting diode). The second segment group 112 has plural arc-shaped segments (not shown in FIGS. 5 and 6) which are arranged along a circular arc in a plan view. Each segment of the second segment group 112 has at least one LED.

After the vehicle 20 has been energized, the first segment group 111 emits light at a first intensity. That is, when the input device 10 is in a state that it cannot receive a prescribed input, the first segment group 111 does not emit light if the first intensity is set at 0. When the input device 10 is in a state that it can receive a prescribed input, the first segment group 111 emits light at a second intensity that is higher than the first intensity. In FIG. 5, to indicate that the that the light emitting circuit 13 is not emitting light, each segment 1111 of the first segment group 111 is drawn as a frame that is not "painted out," and each segment 1112 is drawn by a broken line, and the second segment group 112 is drawn by a thin solid line. On the other hand, in FIG. 6, to indicate that the that the light emitting circuit 13 is emitting light, each segment 1111 of the first segment group 111 is drawn as a "painted-out" frame and each segment 1112 is drawn by a solid line.

In a state that the vehicle 20 is energized and a prescribed input is not being made (i.e., a user is not touching the manipulation surface 11), the first segment group 111 emits light at the first intensity and the second segment group 112 does not emit light. If the first intensity is set at 0, the first segment group 111 does not emit light, either. When a prescribed input is being made (i.e., the user is touching the manipulation surface 11), the first segment group 111 emits light at the second intensity which is higher than the first intensity and at least part of the second segment group 112 emits light according to a finger movement. As shown in FIG. 6, when a "prescribed input" has been made first, the second segment group 112 a left-side end portion 112-A (as viewed in FIG. 6) is rendered in a light emission state. This light emission serves as a mark for an input manipulation and increases the ease of manipulation. Confirming the light emission of the first segment group 111, the user can recognize that the input device 10 has been activated (i.e., input has become possible).

The above-mentioned prescribed input is a two-tap manipulation, that is, a manipulation of tapping the manipulation surface 11 two times consecutively. When a two-tap manipulation is made, the control circuit 4 detects this manipulation from an output of the touch panel circuit 14 and controls the light emitting circuit 13. The reason why a two-tap manipulation on the manipulation surface 11 is employed is to receive an intentional manipulation of a user, that is, to prevent unintended establishment of an input-receivable state. However, a one-tap manipulation may be employed instead.

A description will now be made of a display control that is performed by the control circuit 4 in a case that the second segment group 112 has three segments, that is, a first segment 112-1, a second segment 112-2, and a third segment 112-3 which are arranged parallel with the first segment group 111 in this order.

Figure 7:
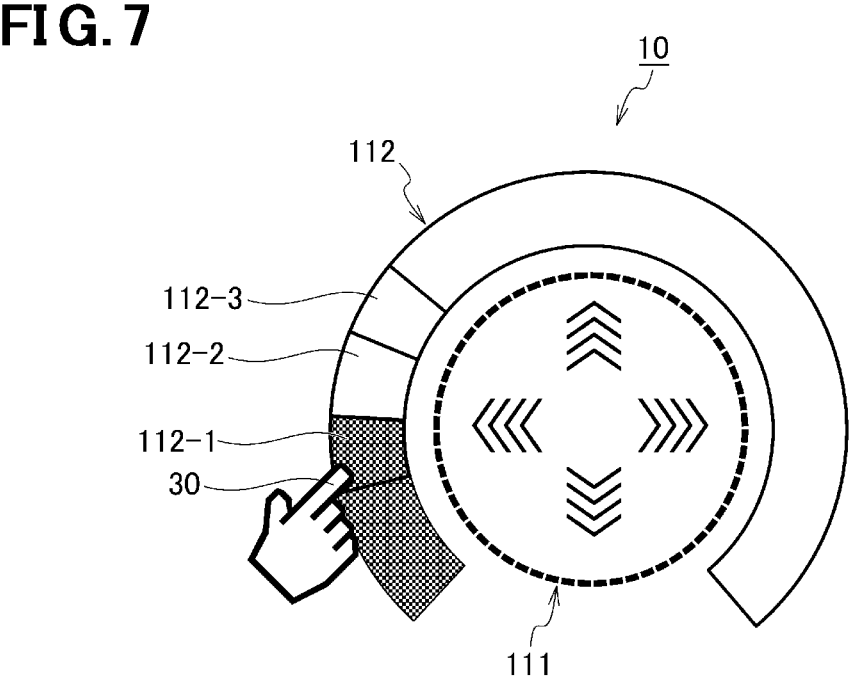
FIG. 7 is a plan view for description of a display control that is performed on a second segment group of the input device according to the embodiment.
Figure 8:
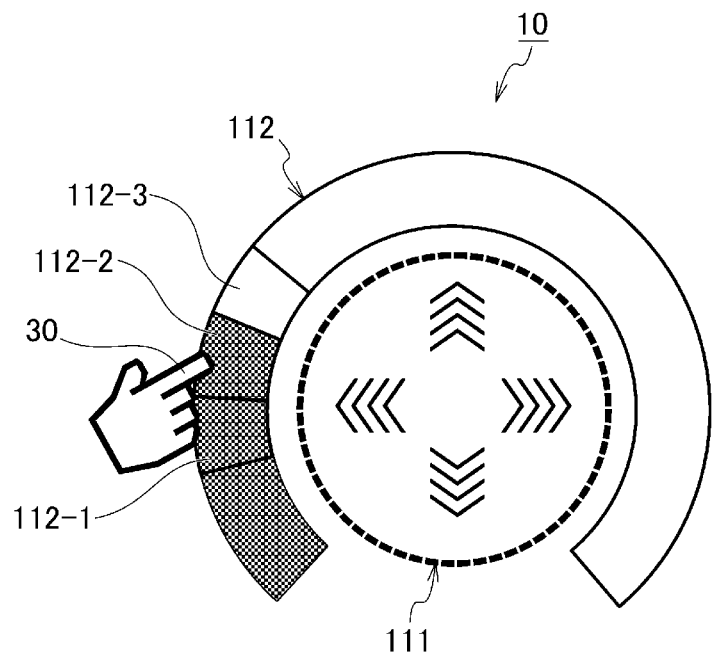
FIG. 8 is a plan view for description of another display control that is performed on the second segment group of the input device according to the embodiment.
Figure 9:
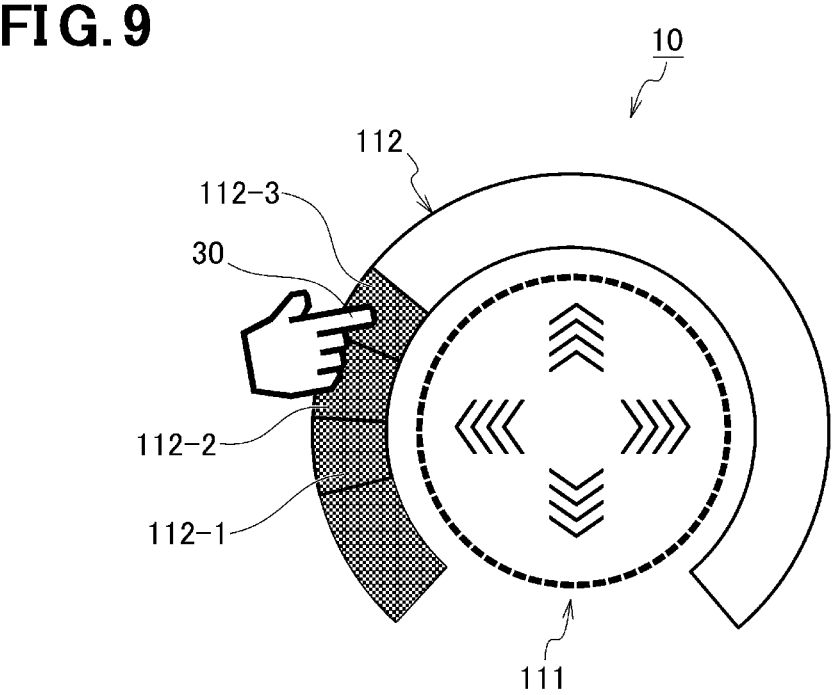
FIG. 9 is a plan view for description of a further display control that is performed on the second segment group of the input device according to the embodiment.

FIGS. 7-9 are plan views for description of a display control that is performed on the three segments of the second segment group 112. This display control is performed in a case that the prescribed input can be received while the first segment group 111 is emitting light at the second intensity that is higher than the first intensity.

Referring to FIG. 7, the first segment 112-1, the second segment 112-2, and the third segment 112-3 indicate magnitudes of a prescribed quantity. If the prescribed quantity has a first value, the control circuit 4 causes the first segment 112-1 to emit light at a third intensity and causes the second segment 112-2 and the third segment 112-3 not to emit light at the third intensity. That is, if the touch panel circuit 14 has detected an action of a finger 30 alongside the first segment group 111 and the current position of the finger 30 corresponds to the first segment 112-1, the control circuit 4 causes the first segment 112-1 to emit light at the third intensity and causes the second segment 112-2 and the third segment 112-3 not to emit light at the third intensity. More specifically, if the finger 30 has moved alongside the first segment group 111, the control circuit 4 acquires a movement distance ($\Delta X$, $\Delta Y$) of the finger 30, converts the acquired movement distance ($\Delta X$, $\Delta Y$) into a change in the second segment group 112 and changes the manner of light emission of the second segment group 112. The third intensity may be the same as the second intensity.

For example, the prescribed quantity is a quantity that determines a sound volume, a quantity that determines an air-conditioner setting temperature, or a quantity that determines a room light brightness level. When the prescribed quantity is equal to a first value, the sound volume is made smallest, the air-conditioner setting temperature is made lowest, or the room light brightness is made darkest.

Referring to FIG. 8, if the prescribed quantity has a second value that is larger than the first value, the control circuit 4 causes the first segment 112-1 and the second segment 112-2 to emit light at the third intensity and causes the third segment 112-3 not to emit light at the third intensity. That is, if the touch panel circuit 14 has detected an action of the finger 30 alongside the first segment group 111 and the current position of the finger 30 corresponds to the second segment 112-2, the control circuit 4 causes the first segment 112-1 and the second segment 112-2 to emit light at the third intensity and causes the third segment 112-3 not to emit light at the third intensity.

Referring to FIG. 9, if the prescribed quantity has a third value that is larger than the second value, the control circuit 4 causes all of the first segment 112-1, the second segment 112-2, and the third segment 112-3 to emit light at the third intensity. That is, if the touch panel circuit 14 has detected an action of the finger 30 alongside the first segment group 111 and the current position of the finger 30 corresponds to the third segment 112-3, the control circuit 4 causes all of the first segment 112-1, the second segment 112-2, and the third segment 112-3 to emit light at the third intensity.

Figure 10:
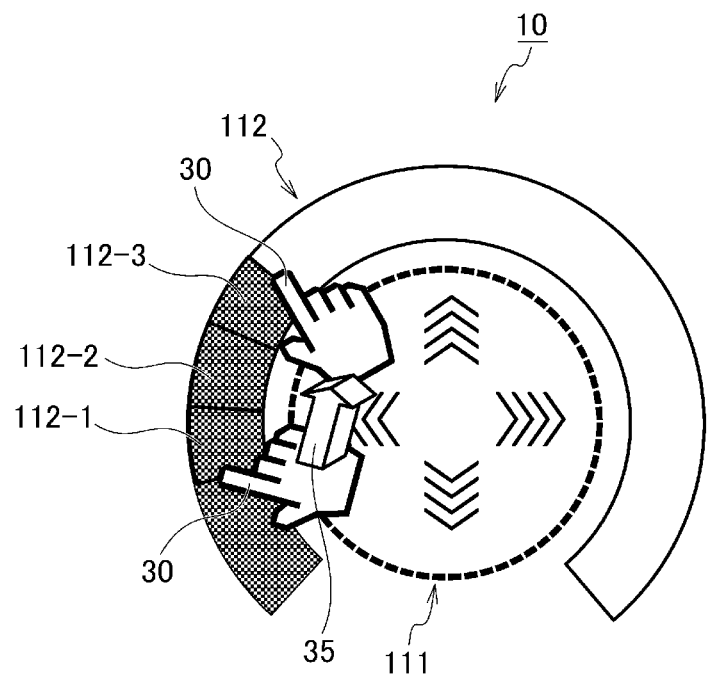
FIG. 10 is a plan view showing a continuous action of a finger alongside a first segment group of the input device according to the embodiment.

As described above, if the touch panel circuit 14 has detected an action of the finger 30 alongside the first segment group 11, the control circuit 4 causes the first segment 112-1, the second segment 112-2, and the third segment 112-3 to emit light at the third intensity in this order according to the action of the finger 30. As the first segment 112-1, the second segment 112-2, and the third segment 112-3 emit light at the third intensity in this order, the prescribed quantity is changed so as to have the first value, the second value, and the third value in this order. FIG. 10 is a plan view showing a continuous action of the finger 30 alongside the first segment group 111. As indicated by an arrow 35, when the finger 30 is moved from the first segment 112-1 to the third segment 112-3, the first segment 112-1, the second segment 112-2, and the third segment 112-3 emit light at the third intensity in this order and the prescribed quantity is changed so as to have the first value, the second value, and the third value in this order.

If the finger 30 has left the manipulation surface 11 after the first segment 112-1, the second segment 112-2, and the third segment 112-3 emitted light at the third intensity in this order, the control circuit 4 holds the state that the first segment 112-1, the second segment 112-2, and the third segment 112-3 are emitting light at the third intensity.

Figure 11:
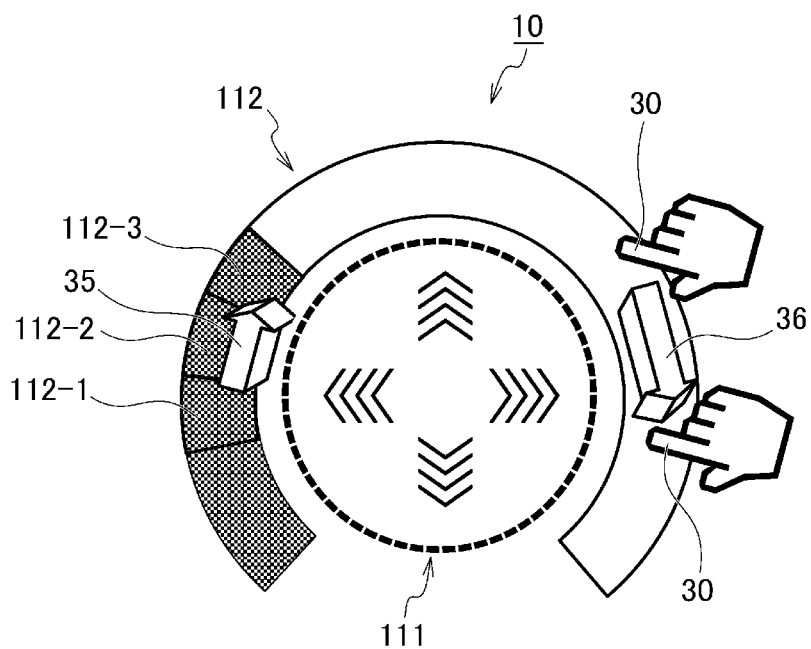
FIG. 11 is a plan view showing an example that the user moves the finger in a right-hand end portion of the second segment group of the input device according to the embodiment.

If the user moves the finger 30 clockwise in any region of the second segment group 112 instead of moving the finger 30 clockwise from the first segment 112-1 to the third segment 112-3, the first segment 112-1, the second segment 112-2, and the third segment 112-3 emit light in this order and the prescribed quantity is changed so as to have the first value, the second value, and the third value in this order. FIG. 11 is a plan view showing an example that the user moves the finger 30 in a right-hand end portion (as viewed in FIG. 11) of the second segment group 112. As indicated by an arrow 36, the finger 30 is moved clockwise in a right-hand end portion of the second segment group 112.

Figure 12:
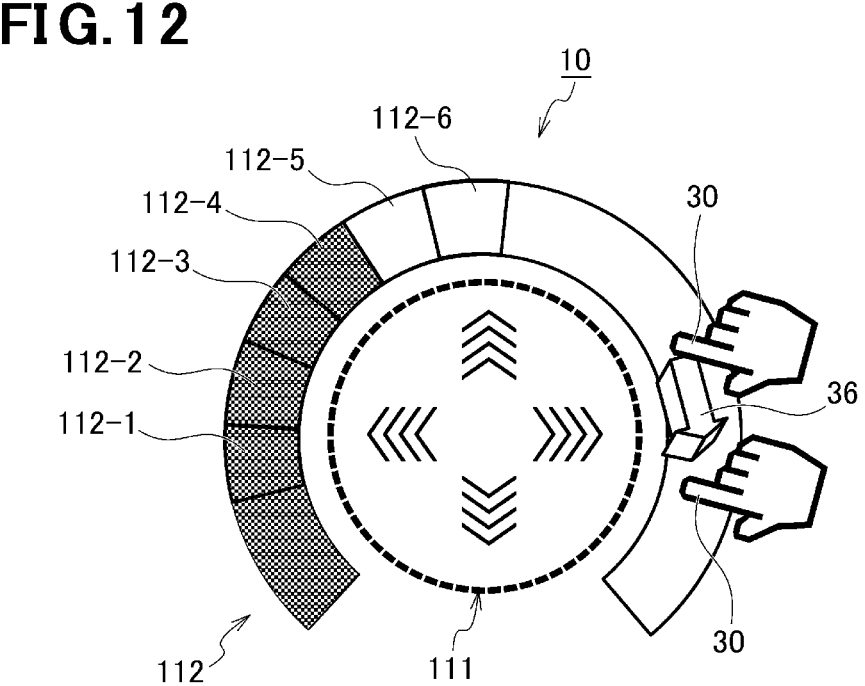
FIG. 12 is a plan view for description of a display control that is performed on six segments of the second segment group of the input device according to the embodiment.
Figure 13:
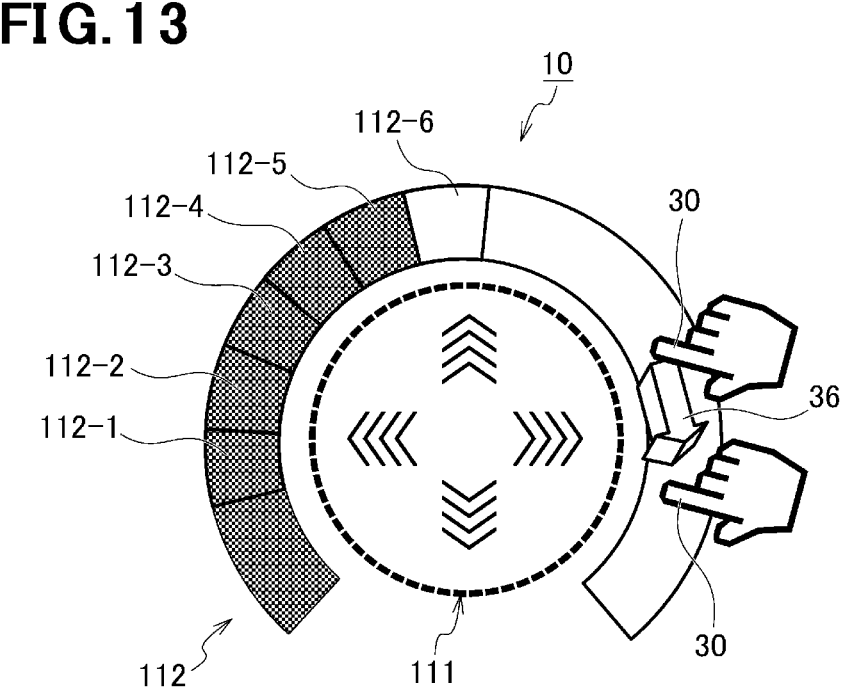
FIG. 13 is a plan view for description of another display control that is performed on the six segments of the second segment group of the input device according to the embodiment.
Figure 14:
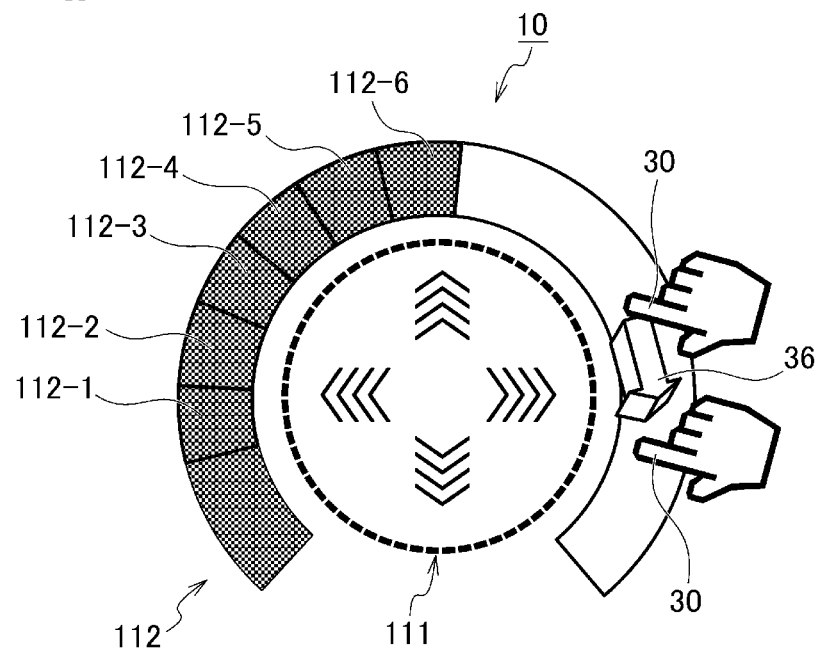
FIG. 14 is a plan view for description of a further display control that is performed on the six segments of the second segment group of the input device according to the embodiment.

FIGS. 12-14 are plan views for description of display control that is performed on six segments of the second segment group 112. This display control is performed in a case that the prescribed input can be received while the first segment group 111 is emitting light at the second intensity that is higher than the first intensity. Controls on the first segment 112-1, the second segment 112-2, and the third segment 112-3 of the second segment group 112 will not be described because they are the same as described above, and only controls on a fourth segment 112-4, a fifth segment 112-5, and a sixth segment 112-6 will be described.

As shown in FIG. 12, the fourth segment 112-4, the fifth segment 112-5, and the sixth segment 112-6 of the second segment group 112 are arranged in order parallel with the first segment group 111. The segments 112-4, 112-5, and 112-6 indicate magnitudes of the prescribed quantity. If the prescribed quantity has a fourth value that is larger than the third value, the control circuit 4 causes the first segment 112-1 to the fourth segment 112-4 to emit light at the third intensity and causes the fifth segment 112-5 and the sixth segment 112-6 not to emit light at the third intensity. That is, if the touch panel circuit 14 has detected an action of the finger 30 alongside the first segment group 111 and the current position of the finger 30 corresponds to the fourth segment 112-4, the control circuit 4 causes the first segment 112-1 to the fourth segment 112-4 to emit light at the third intensity and causes the fifth segment 112-5 and the sixth segment 112-6 not to emit light at the third intensity.

Referring to FIG. 13, if the prescribed quantity has a fifth value that is larger than the fourth value, the control circuit 4 causes the first segment 112-1 to the fifth segment 112-5 to emit light at the third intensity and causes the sixth segment 112-6 not to emit light at the third intensity. That is, if the touch panel circuit 14 has detected an action of the finger 30 alongside the first segment group 111 and the current position of the finger 30 corresponds to the fifth segment 112-5, the control circuit 4 causes the first segment 112-1 to the fifth segment 112-5 to emit light at the third intensity and causes the sixth segment 112-2 not to emit light at the third intensity.

Referring to FIG. 14, if the prescribed quantity has a sixth value that is larger than the fifth value, the control circuit 4 causes all of the first segment 112-1 to the sixth segment 112-6 to emit light at the third intensity. That is, if the touch panel circuit 14 has detected an action of the finger 30 alongside the first segment group 111 and the current position of the finger 30 corresponds to the sixth segment 112-6, the control circuit 4 causes all of the first segment 112-1 to the sixth segment 112-6 to emit light at the third intensity.

If the finger 30 has left the manipulation surface 11 in a state that the first segment 112-1, the second segment 112-2, and the third segment 112-3 are emitting light at the third intensity, the control circuit 4 holds the state that the first segment 112-1, the second segment 112-2, and the third segment 112-3 are emitting light at the third intensity. If the touch panel circuit 14 thereafter detects an action of the finger 30 alongside the first segment group 111 again, the control circuit 4 causes the fourth segment 112-4, the fifth segment 112-5, and the sixth segment 112-6 to emit light at the third intensity in this order according to the action of the finger 30.

As described above, if the touch panel circuit 14 detects an action of the finger 30 alongside the first segment group 111, the control circuit 4 causes the first segment 112-1, the second segment 112-2, the third segment 112-3, the fourth segment 112-4, the fifth segment 112-5, and the sixth segment 112-6 to emit light at the third intensity in this order according to the action of the finger 30. As the first segment 112-1 to the sixth segment 112-6 emit light at the third intensity in this order, the prescribed quantity is changed so as to have the first value, second value, third value, fourth value, fifth value, and sixth value in this order.

Figure 15:
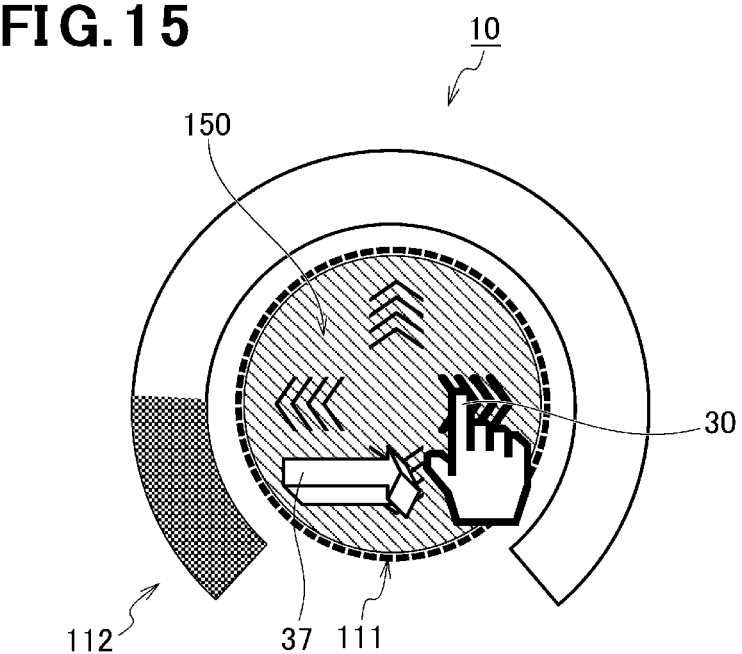
FIG. 15 is a plan view showing a plane coordinates input area of the input device according to the embodiment.

On the other hand, the input device 10 has a function of allowing input of plane coordinates. FIG. 15 is a plan view showing a plane coordinates input area of the input device 10. The manipulation surface 11 of the input device 10 has an input area (prescribed area) 150 capable of detecting plane coordinates. The touch panel circuit 14 can detect sets of plane coordinates arranged in each of at least prescribed directions (e.g., the direction indicated by an arrow 37) across the manipulation surface 11. The prescribed directions can be recognized using the sets of arrow-shaped segments 1112 (see FIG. 5) located inside the first segment group 111. To recognize prescribed directions, marks indicating the prescribed directions may merely be formed on the manipulation surface 11 instead of using the segments 1112. It suffices that at least part of the arrow-shaped segments 1112 be included in the prescribed area 150.

In the plane coordinates input function of the input device 10, if the touch panel circuit 14 detects, through the manipulation surface 11, an action of a finger 30 inside the first segment group 111 or the second segment group 112, the control circuit 4 acquires a movement distance of the finger 30 and outputs it in the form of changes in plane coordinates. Expressing the prescribed directions by arrows enables an intuitive manipulation.

Figure 16:
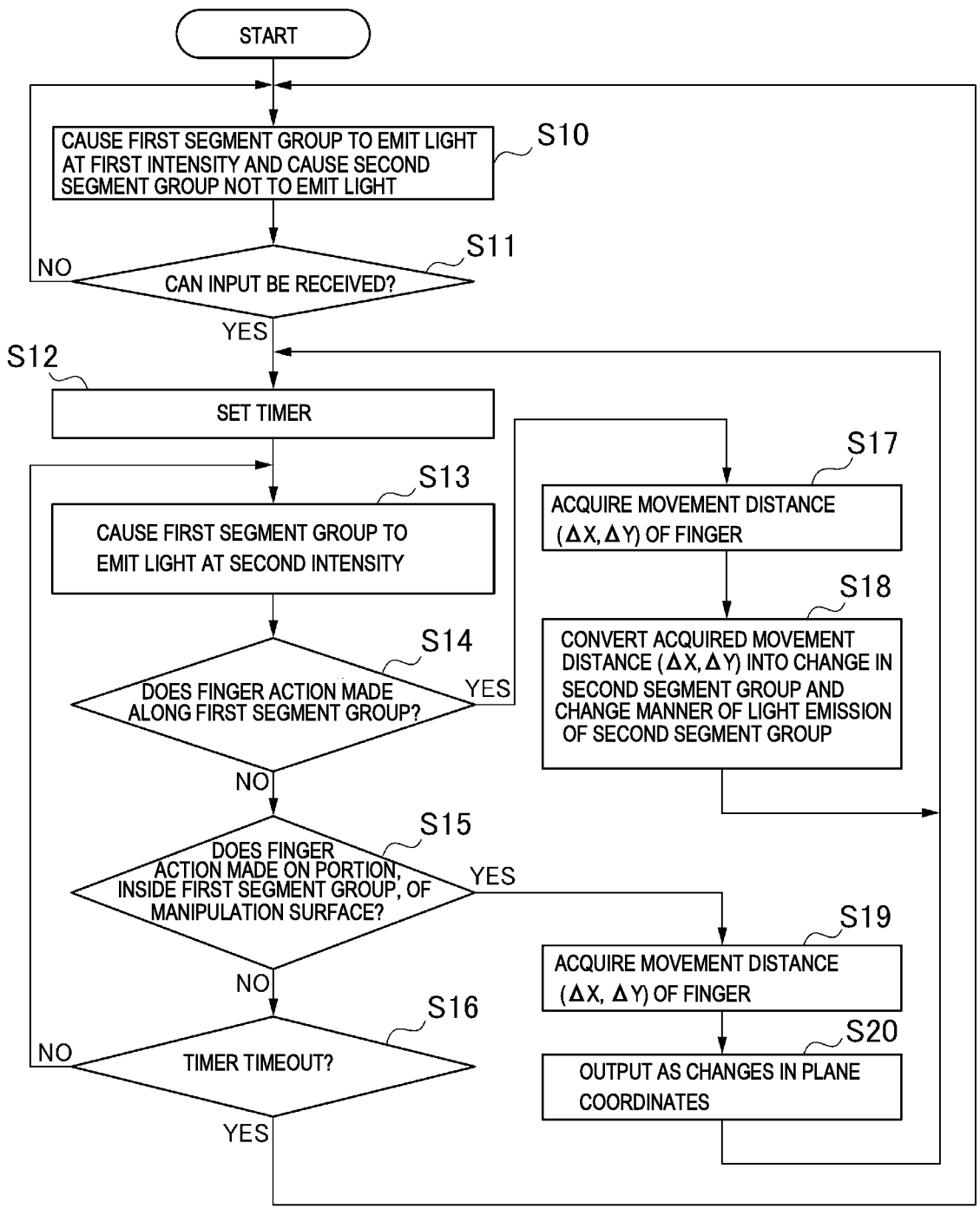
FIG. 16 is a flowchart for description of an operation of a control circuit of the input device according to the embodiment.

FIG. 16 is a flowchart for description of an operation of the control circuit 4 of the input device 10. In this description of the operation, it is assumed that the first segment group 111 is emitting light at the first intensity in a state that the input device 10 is not activated.

Referring to FIG. 16, at step S10, in a state that the input device 10 is not activated, the control circuit 4 causes the first segment group 111 to emit light at the first intensity and causes the second segment group 112 not to emit light. If the first intensity is set at 0, the first segment group 111 is not caused to emit light, either. At step S11, the control circuit 4 judges whether an input can be received in this state. That is, the control circuit 4 judges, on the basis of outputs of the touch panel circuit 14, whether a two-tap manipulation has been performed on the manipulation surface 11. If judging that a two-tap manipulation has not been performed on the manipulation surface 11, the control circuit 4 judges that an input cannot be received (S11: no) and returns to step S10. If judging that a two-tap manipulation has been performed on the manipulation surface 11, the control circuit judges that an input can be received (S11: yes) and sets the timer 41 at step S12.

After setting the timer 41, at step S13 the control circuit 4 causes the first segment group 111 to emit light at the second intensity. At step S14, the control circuit 4 judges whether an action of a finger 30 alongside the first segment group 111 has been made. If judging that an action of the finger 30 alongside the first segment group 111 has not been made (S14: no), at step S15 the control circuit 4 judges whether an action of the finger 30 has been made on the portion, inside the first segment group 111, of the manipulation surface. If judging that no action of the finger 30 has been made on the portion, inside the first segment group 111, of the manipulation surface (S15: no), at step S116 the control circuit 4 judges whether a timer timeout has occurred. If judging that a timer timeout has not occurred (S16: no), the control circuit 4 returns to step S13. If judging that a timer timeout has occurred (S16: yes), the control circuit 4 returns to step S10.

If judging that an action of the finger 30 has been made along the first segment group 111 within a set timer time (S14: yes), at step S17 the control circuit 4 acquires a movement distance (ΔX, ΔY) of the finger 30 on the basis of outputs of the touch panel circuit 14. At step S18, the control circuit 4 converts the acquired movement distance (ΔX, ΔY) of the finger 30 into a change in the second segment group 112 and changes the manner of light emission of the second segment group 112. For example, the movement distance of the finger 30 corresponds to a change to the third segment 112-3 of the second segment group 112, the control circuit 4 causes the first segment 112-1, the second segment 112-2, and the third segment 112-3 to emit light at the third intensity. After changing the manner of light emission of the second segment group 112, the control circuit 4 returns to step S12.

If judging that an action of the finger 30 has been made on the portion, inside the first segment group 111, of the manipulation surface within the set timer time (S15: yes), the control circuit 4 acquires a movement distance (ΔX, ΔY) of the finger 30 on the basis of outputs of the touch panel circuit 14 at step S19 and outputs it to another device as changes in plane coordinates at step S20. After outputting the acquired movement distance (ΔX, ΔY) of the finger 30 to the other device as the changes in plane coordinates, the control circuit 4 returns to step S12.

As described above, the input device 10 according to the embodiment is equipped with the manipulation surface 11 that can be touched by at least a finger 30, the light emitting circuit 13 which is disposed along (for example, parallel with) the manipulation surface 11 and can emit visible light, the touch panel circuit 14 capable of detecting an action of at least the finger 30 on the manipulation surface 11, and the control circuit 4 which controls the light emitting circuit 13 on the basis of outputs of the touch panel circuit 14. The light emitting circuit 13 has the first segment group 111 and the second segment group 112. The first segment group 111 is disposed along a circle in a plan view, and the second segment group 112 is disposed along the first segment group 111 in a plan view. The control circuit 4 causes the first segment group 111 to emit light at the first intensity if the touch panel circuit 14 cannot receive the prescribed input. The control circuit 4 causes the first segment group 111 to emit light at the second intensity that is higher than the first intensity if the touch panel circuit 14 can receive the prescribed input. The control circuit 4 causes at least part of the second segment group 112 to emit light if the touch panel circuit 14 has detected an action of the finger 30 alongside the first segment group 111 while the first segment group 111 is emitting light at the second intensity. As a result, a display control can be performed easily and input for setting, for example, a sound volume, an air-conditioner setting temperature, or a room light brightness level can be made easily and intuitively.

Although in the input device 10 according to the embodiment the plural segments 112-1, 112-2, constituting the second segment group 112 are arranged continuously, they may be arranged discontinuously.

Figure 17:
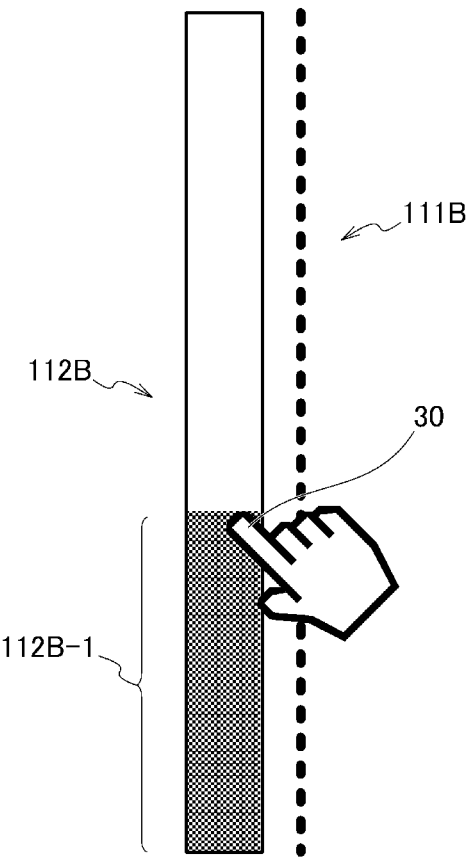
FIG. 17 is a plan view of a linear first segment group and a rod-shaped second segment group of an input device according to a modification of the embodiment.

Although in the input device 10 according to the embodiment the segments 1111 of the first segment group 111 are arranged along a circle, they may be arranged along a line segment. In this case, each of the segments (112-1, 112-2, ...) of the second segment group (112) is shaped like a rod because they are arranged parallel with the first segment group 111. FIG. 17 is a plan view of a linear first segment group 111B and a rod-shaped second segment group 112B. In the example shown in FIG. 17, a lower end portion 112B-1 of the second segment group 112B serves to emit light.

Figure 18:
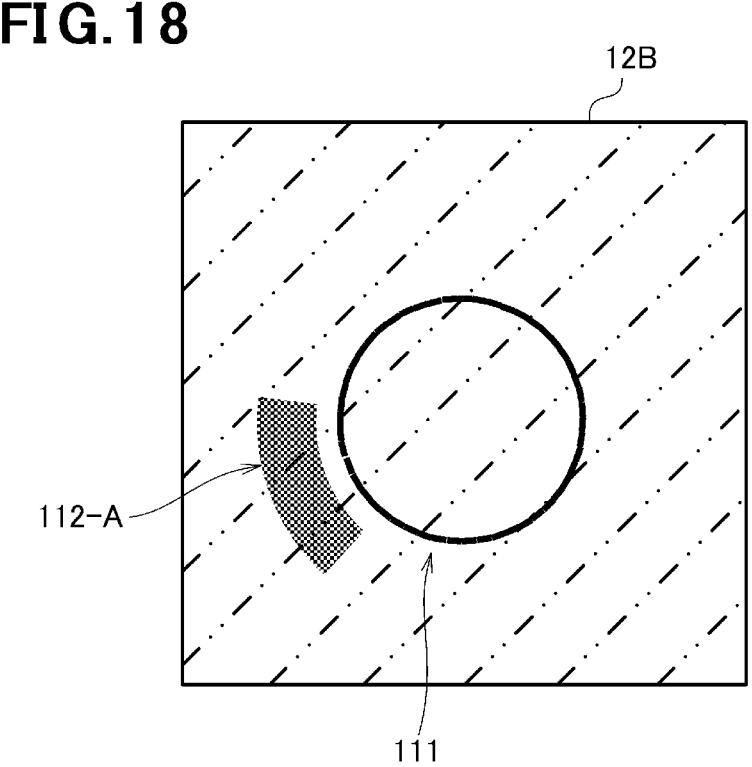
FIG. 18 is a plan view of an input device according to another modification of the embodiment that employs a decorated sheet.
Figure 19:
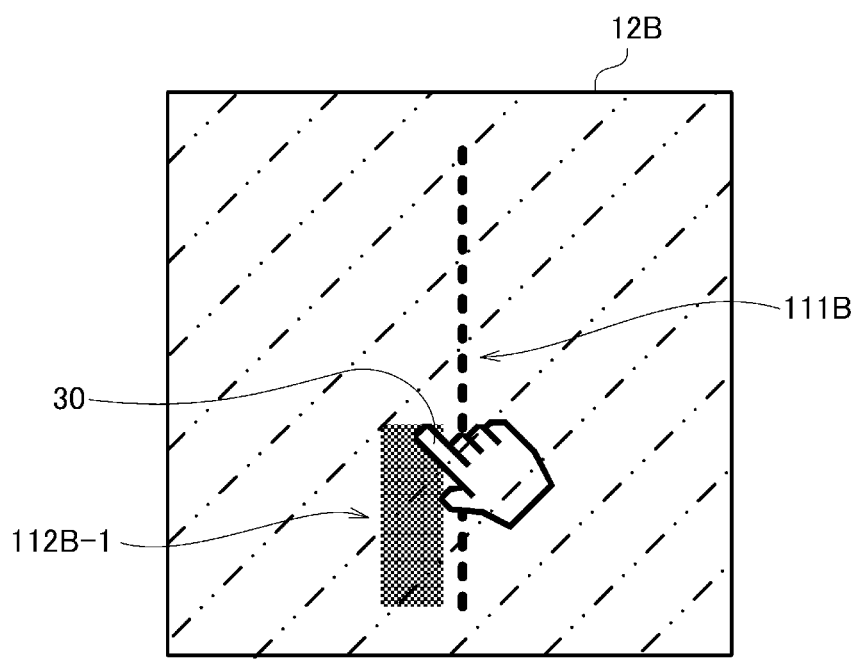
FIG. 19 is a plan view of an input device according to a further modification of the embodiment that is equipped with the linear first segment group and the rod-shaped second segment group and employs the decorated sheet.

Although in the input device 10 according to the embodiment the sheet 12 is a transparent sheet, it may be a decorated sheet having wood grain, for example. Increase in appearance can be attained by employing the decorated sheet. FIG. 18 is a plan view of an example in which a decorated sheet 12B is employed in the input device 10 according to the embodiment. FIG. 19 is a plan view of an example in which the decorated sheet 12B is employed in the input device having the linear first segment group 111B and a rod-shaped second segment group 112B.

Although in the input device 10 according to the embodiment the light emitting circuit 13 causes the first segment group 111 and the second segment group 112 to emit light, another configuration is possible in which the light emitting circuit 13 is implemented as a display circuit and the first segment group 111 and the second segment group 112 are made images that are displayed by the display circuit.

Although the input device 10 according to the embodiment has been described above mainly for the case that the number of segments that emit light increases, the number of segments that emit light decreases if a finger 30 is slid in the opposite direction (counterclockwise).

The input device according to the disclosure is useful when used as an input device for adjusting, for example, a sound volume, an air-conditioner temperature, and a room light brightness level in vehicles such as automobiles.

Here, the above embodiments are summarized as follows.

There is provided an input device including: a manipulation surface configured to be touched by a finger, a light emitting circuit disposed along the manipulation surface and configured to emit light, and a detection circuit configured to detect an action of the finger on the manipulation surface, in which the light emitting circuit has a first segment group and a second segment group; the first segment group is disposed along a prescribed shape in a plan view; the second segment group is disposed along the first segment group in a plan view; the first segment group emits light at a first intensity if the detection circuit is restricted to receive a prescribed input; the first segment group emits light at a second intensity that is higher than the first intensity if the detection circuit is allowed to receive the prescribed input; and at least part of the second segment group emits light if the detection circuit detects an action of the finger alongside the first segment group while the first segment group is emitting light at the second intensity.

According to the disclosure, since the light emitting circuit is only one element to perform display, the display control is made easier and cost reduction can be attained. Furthermore, a manipulation required is merely sliding a finger across the manipulation surface, input can be made easily and intuitively.

In the input device having the above configuration, for example, the first intensity be equal to 0.

According to this feature, since the first segment group is rendered in a non-emission state when the prescribed input cannot be received, the input device can be hidden when it is not used.

In the input device having the above configuration, for example, the detection circuit be a touch panel circuit that is disposed along and between the manipulation surface and the light emitting circuit.

According to this feature, input can be made easily by a touch manipulation.

In the input device having the above configuration, for example, each segment of the first segment group have at least one LED and each segment of the second segment group have at least one LED.

According to this feature, since each segment of the first segment group and each segment of the second segment group employ an LED, the input device is increased in visibility and power saving.

In the input device having the above configuration, for example, the light emitting circuit be a display circuit and that each of the first segment group and the second segment group be an image displayed by the display circuit.

According to this feature, each of the first segment group and the second segment group can be displayed as an image that is suitable for colors employed in a vehicle compartment and shapes of various objects existing in the compartment or tastes of a user. Furthermore, since characters and symbols can be displayed, it becomes possible to provide various kinds of information.

In the input device having the above configuration, for example, the display circuit be an organic EL display circuit or a liquid crystal display circuit having a backlight.

According to this feature, since the organic EL display circuit or a liquid crystal display circuit having a backlight is used, the input device is increased in visibility and power saving.

In the input device having the above configuration, for example, the prescribed shape be a circle.

According to this feature, it becomes possible to adjust, for example, a sound volume, an air-conditioner setting temperature, or a room light brightness level intuitively by tracing the circle.

In the input device having the above configuration, for example, the prescribed shape is a line segment.

According to this feature, it becomes possible to adjust, for example, a sound volume, an air-conditioner setting temperature, or a room light brightness level intuitively by tracing the line segment.

For example, the input device having the above configuration further includes: a sheet disposed along the manipulation surface and configured to transmit the prescribed light.

According to this feature, the manipulation surface can be protected by the sheet.

In the input device having the above configuration, for example, the sheet be a decorated sheet.

According to this feature, the appearance can be improved in addition to the advantage that the manipulation surface can be protected.

In the input device having the above configuration, for example, the decorated sheet have wood grain.

According to this feature, the appearance can be improved by employing a woodgrain-toned decorated sheet.

In the input device having the above configuration, for example, the second segment group has a first segment, a second segment, and a third segment that are arranged along the first segment group in this order and serve to indicate magnitudes of a prescribed quantity; that if the prescribed quantity has a first value, the first segment emit light at a third intensity and neither the second segment nor the third segment emit light at the third intensity; that if the prescribed quantity has a second value that is larger than the first value, the first segment and the second segment emit light at the third intensity and the third segment not emit light at the third intensity; and that if the prescribed quantity has a third value that is larger than the second value, all of the first segment, the second segment, and the third segment emit light at the third intensity.

According to these features, it becomes possible to adjust, for example, a sound volume, an air-conditioner setting temperature, or a room light brightness level easily by configuring the second segment group by at least the first segment, the second segment, and the third segment by indicating a magnitude of the prescribed quantity by a manner of light emission of these segments.

In the input device having the above configuration, for example, if the detection circuit detects an action of the finger alongside the first segment group while the first segment group is emitting light at the second intensity, the first segment, the second segment, and the third segment emit light at the third intensity in this order according to the action of the finger.

According to this feature, it becomes possible to adjust, for example, a sound volume, an air-conditioner setting temperature, or a room light brightness level easily by causing the first segment, the second segment, and the third segment of the second segment group emit light at the third intensity in this order according to an action of the finger.

In the input device having the above configuration, for example, the prescribed quantity change so as to have the first value, the second value, and the third value as the first segment, the second segment, and the third segment emit light at the third intensity in this order according to the action of the finger.

According to this feature, since the prescribed quantity is changed so as to have the first value, the second value, and the third value as the first segment, the second segment, and the third segment emit light at the third intensity in this order according to the action of the finger, it becomes possible to recognize an approximate sound volume, air-conditioner setting temperature, or room light brightness level easily.

In the input device having the above configuration, for example, the detection circuit detect, as positions of the finger moving alongside the first segment group while the first segment group is emitting light at the second intensity, positions corresponding to the first segment, the second segment, and the third segment, respectively.

According to this feature, since positions of the finger moving alongside the first segment group are correlated with the first segment, the second segment, and the third segment of the second segment group, it becomes possible to adjust, for example, a sound volume, an air-conditioner setting temperature, or a room light brightness level easily.

In the input device having the above configuration, for example, if the detection circuit detects an action of the finger alongside the first segment group while the first segment group is emitting light at the second intensity, the first segment, the second segment, and the third segment emit light at the third intensity in this order according to the action of the finger; and then, even if the finger has left the manipulation surface, a state that the first segment, the second segment, and the third segment are emitting light at the third intensity is maintained.

According to this feature, if the finger has left the manipulation surface after being moved alongside the first segment group, light emission states of the first segment, the second segment, and the third segment immediately before the leaving of the finger from the manipulation surface are maintained. As a result, it becomes possible to recognize visually that an adjusted state of, for example, a sound volume, an air-conditioner setting temperature, or a room light brightness level is maintained.

In the input device having the above configuration, for example, the second segment group further have a fourth segment, a fifth segment, and a sixth segment that are arranged parallel with the first segment group in this order and serve to indicate magnitudes of the prescribed quantity; that if the prescribed quantity has a fourth value that is larger than the third value, the first segment to the fourth segment emit light at the third intensity and neither the fifth segment nor the sixth segment emit light at the third intensity; that if the prescribed quantity has a fifth value that is larger than the fourth value, the first segment to the fifth segment emit light at the third intensity and the sixth segment not emit light at the third intensity; that if the prescribed quantity has a sixth value that is larger than the fifth value, all of the first segment to the sixth segment emit light at the third intensity; and that if the finger has left the manipulation surface, a state that the first segment, the second segment, and the third segment are emitting light at the third intensity is maintained, and then if the detection circuit detects an action of the finger alongside the first segment group, the fourth segment, the fifth segment, and the sixth segment emit light at the third intensity in this order.

According to these features, since the second segment group is configured by at least the first segment to the sixth segment so as to indicate magnitudes of the prescribed quantity, it becomes possible to adjust, for example, a sound volume, an air-conditioner setting temperature, or a room light brightness level finely.

In the input device having the above configuration, for example, the detection circuit be able to detect plane coordinates that are inside the first segment group or the second segment group and are defined in the manipulation surface.

According to this feature, it becomes possible to detect plane coordinates in the manipulation surface and output the detected plane coordinates to another device.

In the input device having the above configuration, for example, the manipulation surface have a prescribed area where the plane coordinates can be detected; that the detection circuit be able to detect plane coordinates in at least prescribed directions across the manipulation surface; that the manipulation surface has a display indicating the prescribed direction; and that at least part of the display is included in the prescribed area.

According to these features, it becomes possible to output a distance of a movement of the finger relative to the manipulation surface in the form of changes in plane coordinates.

In the input device having the above configuration, for example, the display is expressed as an arrow.

According to this feature, an intuitive manipulation is enabled by expressing the display indicating the prescribed directions as arrows.

In the input device having the above configuration, for example, the detection circuit be able to detect plane coordinates that are inside the first segment group or the second segment group and are defined in the manipulation surface while the first segment group is emitting light at the second intensity.

According to this feature, plane coordinates is configured to be detected only while the first segment group is emitting light at the second intensity.

The disclosure facilitates a display control and makes it possible to perform, easily and intuitively, input for adjusting, for example, a sound volume, an air-conditioner setting temperature, or a room light brightness level.

The present application is based on Japanese Patent Application No. 2018-219236 filed on Nov. 22, 2018, the contents of which are incorporated herein by reference.

What is claimed is:

1. An input device comprising:
   a manipulation surface configured to be touched by a finger;
   a light emitting circuit disposed along the manipulation surface and configured to emit light; and
   a detection circuit configured to detect an action of the finger on the manipulation surface, wherein:
   the light emitting circuit has a first segment group and a second segment group;
   the first segment group is disposed along a prescribed shape in a plan view;
   the second segment group is disposed along the first segment group in a plan view;
   the first segment group emits light at a first intensity if the detection circuit is restricted to receive a prescribed input;
   the first segment group emits light at a second intensity that is higher than the first intensity if the detection circuit is allowed to receive the prescribed input;
   at least part of the second segment group emits light if the detection circuit detects an action of the finger alongside the first segment group while the first segment group is emitting light at the second intensity;
   the second segment group has a first segment, a second segment, and a third segment that are arranged along the first segment group in this order and serve to indicate magnitudes of a prescribed quantity;
   if the prescribed quantity has a first value, the first segment emits light at a third intensity and neither the second segment nor the third segment emits light at the third intensity;
   if the prescribed quantity has a second value that is larger than the first value, the first segment and the second segment emit light at the third intensity and the third segment does not emit light at the third intensity;

if the prescribed quantity has a third value that is larger than the second value, all of the first segment, the second segment, and the third segment emit light at the third intensity; and if the detection circuit detects an action of the finger alongside the first segment group while the first segment group is emitting light at the second intensity, the first segment, the second segment, and the third segment emit light at the third intensity in this order according to the action of the finger.

2. The input device according to claim 1, wherein the first intensity is equal to 0.

3. The input device according to claim 1, wherein the detection circuit is a touch panel circuit that is disposed along and between the manipulation surface and the light emitting circuit.

4. The input device according to claim 1, wherein each segment of the first segment group has at least one LED and each segment of the second segment group has at least one LED.

5. The input device according to claim 1, wherein:
the light emitting circuit is a display circuit; and
the first segment group and the second segment group are images displayed by the display circuit.

6. The input device according to claim 5, wherein the display circuit is an organic EL display circuit or a liquid crystal display circuit having a backlight.

7. The input device according to claim 1, wherein the prescribed shape is a circle or a line segment.

8. The input device according to claim 1, further comprising:
a sheet disposed along the manipulation surface and configured to transmit the prescribed light.

9. The input device according to claim 8, wherein the sheet is a decorated sheet.

10. The input device according to claim 9, wherein the decorated sheet has wood grain.

11. The input device according to claim 1, wherein the prescribed quantity changes so as to have the first value, the second value, and the third value as the first segment, the second segment, and the third segment emit light at the third intensity in this order according to the action of the finger.

12. The input device according to claim 11, wherein if the detection circuit detects an action of the finger alongside the first segment group while the first segment group is emitting light at the second intensity, the first segment, the second segment, and the third segment emit light at the third intensity in this order according to the action of the finger; and then
even if the finger has left the manipulation surface thereafter, a state that the first segment, the second segment, and the third segment are emitting light at the third intensity is maintained.

13. The input device according to claim 12, wherein:
the second segment group further has a fourth segment, a fifth segment, and a sixth segment that are arranged along the first segment group in this order and serve to indicate magnitudes of the prescribed quantity;
if the prescribed quantity has a fourth value that is larger than the third value, the first segment to the fourth segment emit light at the third intensity and neither the fifth segment nor the sixth segment emits light at the third intensity;
if the prescribed quantity has a fifth value that is larger than the fourth value, the first segment to the fifth segment emit light at the third intensity and the sixth segment does not emit light at the third intensity;

if the prescribed quantity has a sixth value that is larger than the fifth value, all of the first segment to the sixth segment emit light at the third intensity; and if the finger has left the manipulation surface, a state that the first segment, the second segment, and the third segment are emitting light at the third intensity is maintained, and then if the detection circuit detects an action of the finger alongside the first segment group, the fourth segment, the fifth segment, and the sixth segment emit light at the third intensity in this order.

14. The input device according to claim 1, wherein the detection circuit detects, as positions of the finger moving alongside the first segment group while the first segment group is emitting light at the second intensity, positions corresponding to the first segment, the second segment, and the third segment, respectively.

15. The input device according to claim 14, wherein if the detection circuit detects an action of the finger alongside the first segment group while the first segment group is emitting light at the second intensity, the first segment, the second segment, and the third segment emit light at the third intensity in this order according to the action of the finger; and then
even if the finger has left the manipulation surface thereafter, a state that the first segment, the second segment, and the third segment are emitting light at the third intensity is maintained.

16. The input device according to claim 15, wherein:
the second segment group further has a fourth segment, a fifth segment, and a sixth segment that are arranged along the first segment group in this order and serve to indicate magnitudes of the prescribed quantity;
if the prescribed quantity has a fourth value that is larger than the third value, the first segment to the fourth segment emit light at the third intensity and neither the fifth segment nor the sixth segment emits light at the third intensity;
if the prescribed quantity has a fifth value that is larger than the fourth value, the first segment to the fifth segment emit light at the third intensity and the sixth segment does not emit light at the third intensity;
if the prescribed quantity has a sixth value that is larger than the fifth value, all of the first segment to the sixth segment emit light at the third intensity; and
if the finger has left the manipulation surface, a state that the first segment, the second segment, and the third segment are emitting light at the third intensity is maintained, and then if the detection circuit detects an action of the finger alongside the first segment group, the fourth segment, the fifth segment, and the sixth segment emit light at the third intensity in this order.

17. An input device comprising:
a manipulation surface configured to be touched by a finger;
a light emitting circuit disposed along the manipulation surface and configured to emit light; and
a detection circuit configured to detect an action of the finger on the manipulation surface, wherein:
the light emitting circuit has a first segment group and a second segment group;
the first segment group is disposed along a prescribed shape in a plan view;
the second segment group is disposed along the first segment group in a plan view;

the first segment group emits light at a first intensity if the detection circuit is restricted to receive a prescribed input;

the first segment group emits light at a second intensity that is higher than the first intensity if the detection circuit is allowed to receive the prescribed input;

at least part of the second segment group emits light if the detection circuit detects an action of the finger alongside the first segment group while the first segment group is emitting light at the second intensity;

the detection circuit is configured to detect plane coordinates that are inside the first segment group or the second segment group and are defined in the manipulation surface;

the manipulation surface has a prescribed area where the plane coordinates can be detected;

the detection circuit is configured to detect plane coordinates in at least prescribed direction across the manipulation surface;

the manipulation surface has a display indicating the prescribed direction; and at least part of the display is included in the prescribed area.

18. The input device according to claim 17, wherein the display is expressed as an arrow.

19. The input device according to claim 17, wherein the first intensity is equal to 0.

20. The input device according to claim 17, wherein:
the light emitting circuit is a display circuit; and
the first segment group and the second segment group are images displayed by the display circuit.

21. An input device comprising:
a manipulation surface configured to be touched by a finger;
a light emitting circuit disposed along the manipulation surface and configured to emit light; and
a detection circuit configured to detect an action of the finger on the manipulation surface, wherein:
the light emitting circuit has a first segment group and a second segment group;
the first segment group is disposed along a prescribed shape in a plan view;
the second segment group is disposed along the first segment group in a plan view;
the first segment group emits light at a first intensity if the detection circuit is restricted to receive a prescribed input;
the first segment group emits light at a second intensity that is higher than the first intensity if the detection circuit is allowed to receive the prescribed input;
at least part of the second segment group emits light if the detection circuit detects an action of the finger alongside the first segment group while the first segment group is emitting light at the second intensity; and
the detection circuit is configured to detect plane coordinates that are inside the first segment group or the second segment group and are defined in the manipulation surface while the first segment group is emitting light at the second intensity.

22. The input device according to claim 21, wherein the first intensity is equal to 0.

23. The input device according to claim 21, wherein:
the light emitting circuit is a display circuit; and
the first segment group and the second segment group are images displayed by the display circuit.

* * * * *